(12) United States Patent
Ito

(10) Patent No.: US 9,694,601 B2
(45) Date of Patent: Jul. 4, 2017

(54) PRINT TARGET SURFACE REFORMING DEVICE

(71) Applicant: EZAWA JIMUKI CO., LTD., Kiyosu-shi, Aichi-ken (JP)

(72) Inventor: Yuhiko Ito, Nagoya (JP)

(73) Assignee: EZAWA JIMUKI CO., LTD., Kiyosu (JP)

(*) Notice: Subject to any disclaimer, the term of this patent is extended or adjusted under 35 U.S.C. 154(b) by 0 days.

(21) Appl. No.: 15/111,423

(22) PCT Filed: Jan. 28, 2015

(86) PCT No.: PCT/JP2015/052354
§ 371 (c)(1),
(2) Date: Jul. 13, 2016

(87) PCT Pub. No.: WO2015/119017
PCT Pub. Date: Aug. 13, 2015

(65) Prior Publication Data
US 2016/0332461 A1    Nov. 17, 2016

(30) Foreign Application Priority Data
Feb. 4, 2014  (JP) .................................. 2014-019278

(51) Int. Cl.
*G01N 21/00* (2006.01)
*B41J 11/00* (2006.01)
(Continued)

(52) U.S. Cl.
CPC ....... *B41J 11/0015* (2013.01); *B01D 53/8675* (2013.01); *B41F 23/0453* (2013.01); *B41J 2/01* (2013.01); *B41J 29/02* (2013.01)

(58) Field of Classification Search
CPC ...... C09D 11/102; B05D 3/061; B05D 3/063; B05D 3/064
(Continued)

(56) References Cited

U.S. PATENT DOCUMENTS 6,276,042 B1 * 8/2001 Hammond .............. B25B 25/00
                                                        24/273
8,639,149 B2   1/2014 Tanaka
(Continued)

FOREIGN PATENT DOCUMENTS

JP    H11-16498 A    1/1999
JP    2001-250108 A  9/2001
(Continued)

OTHER PUBLICATIONS

UVCS Version 2.0 Operation Manual, DYMAX, Sep. 6, 2012, pp. 1-24.*
(Continued)

*Primary Examiner* — Jason McCormack
(74) *Attorney, Agent, or Firm* — Oliff PLC

(57) ABSTRACT

A print target surface reforming device that makes it possible to obtain a higher reforming effect than in the prior art. A print target surface reforming device that reforms a print target surface and that is provided with: a conveyance section that is arranged more to the front than a printer on a printing line that automatically conveys a print target to the printer and performs printing, the conveyance section including on the upper surface thereof a conveyance path on which the print target is conveyed with the print target surface thereof facing upward; and a light source that is arranged so as to face the conveyance path and that emits light having a wavelength of 242 nm or less onto the print target surface of the print target that moves along the conveyance path.

16 Claims, 18 Drawing Sheets

(51) Int. Cl.
*B01D 53/86* (2006.01)
*B41J 29/02* (2006.01)
*B41F 23/04* (2006.01)
*B41J 2/01* (2006.01)

(58) Field of Classification Search
USPC .................................. 250/453.11, 454.11
See application file for complete search history.

(56) References Cited

U.S. PATENT DOCUMENTS

| | | | |
|---|---|---|---|
| 2003/0155228 A1* | 8/2003 | Mills ...................... | B01D 53/72 204/157.3 |
| 2006/0231395 A1 | 10/2006 | Ihme et al. | |
| 2008/0138641 A1* | 6/2008 | Leenders ............. | B41M 5/0029 428/545 |
| 2011/0316924 A1* | 12/2011 | Kobayashi ............... | B41J 11/06 347/16 |
| 2013/0320235 A1* | 12/2013 | Lien ................. | H01L 21/67115 250/454.11 |
| 2014/0183006 A1* | 7/2014 | Tully .................. | B65G 13/071 198/789 |

FOREIGN PATENT DOCUMENTS

| | | |
|---|---|---|
| JP | 2003-311940 A | 11/2003 |
| JP | 2003-327320 A | 11/2003 |
| JP | 2004-090508 A | 3/2004 |
| JP | 2006-052030 A | 2/2006 |
| JP | 2009-212429 A | 9/2009 |
| JP | 2010-100011 A | 5/2010 |
| JP | 2012-081608 A | 4/2012 |
| JP | 2012-218845 A | 11/2012 |
| WO | 2004/108415 A2 | 12/2004 |

OTHER PUBLICATIONS

Apr. 21, 2015 International Search Report issued in International Application No. PCT/JP2015/052354.
Apr. 21, 2016 Decision to Grant Patent issued in Japanese Patent Application No. 2015-014333.
Apr. 21, 2015 Written Opinion of the International Searching Authority issued in International Application No. PCT/JP2015/052354.
Mar. 23, 2016 Office Action issued in Japanese Patent Application No. 2015-014333.
Mar. 30, 2017 Search Report issued in European Patent Application No. 15746359.7.

* cited by examiner

PRINT TARGET SURFACE REFORMING DEVICE

TECHNICAL FIELD

The present invention relates to a print target surface reforming device that reforms the print target surface of a print target to make an ink easily adhere thereto at the time of printing.

BACKGROUND ART

Conventionally, as this type of print target surface reforming device, a device that brings the print target into contact with plasma or corona discharge to perform reformation (for example, see Patent Literature 1) is known.

RELATED ART DOCUMENTS

Patent Documents

PATENT DOCUMENT 1: Japanese Published Unexamined Patent Application No. 2003-311940 (paragraphs [0007] and [0009])

SUMMARY OF INVENTION

Problems to be Solved by the Invention

However, in the conventional print target surface reforming device described above, a sufficient reforming effect cannot be obtained, and the ink for printing may be separated from the print target.

The present invention is made in view of the foregoing circumstances, and an object thereof is to provide a print target surface reforming device that can obtain a higher reforming effect than the conventional device.

Means of Solving the Problems

A print target surface reforming device according to a first embodiment designed to achieve the above object is arranged, in a print line where a print target is automatically transported to a printer and printing is performed, on a front side with respect to the printer and reforms a print target surface of the print target. The print target surface reforming device includes a transport portion which includes a plurality of metal rollers arranged horizontally and laterally and which includes, on an upper surface of a group of the metal rollers, a transport path along which the print target is transported with the print target surface facing upward, a rotation drive source which drives the plurality of metal rollers to rotate, a light source which is arranged opposite the transport path and which emits light of 242 nm or less to the print target surface of the print target that is moved along the transport path, a roller group lower cover which covers the group of the metal rollers from a lower side, and an ozone suction processing portion which brings an interior of the roller group lower cover into a negative pressure state to suck ozone generated by the light source, which decomposes the ozone into oxygen and which discharges the oxygen.

A print target surface reforming device according to a second embodiment is arranged, in a print line where a print target is automatically transported to a printer and printing is performed, on a front side with respect to the printer and reforms a print target surface of the print target. The print target surface reforming device includes a transport portion that includes a plurality of metal rollers arranged horizontally and laterally and that includes a transport path which is arranged in a position, in an upper surface of a group of the metal rollers, displaced to one end of the group of the metal rollers in a direction of a rotation shaft and along which the print target is transported with the print target surface facing upward, a rotation drive source which drives the metal rollers to rotate, a friction belt which is arranged in a position displaced to the other end of the group of the metal rollers in the direction of the rotation shaft, which is pressed by the group of the metal rollers from above or below and which receives power from the rotation drive source so as to be driven to rotate, a belt support roller which supports the friction belt from inside, and a light source which is arranged opposite the transport path and which emits light of 242 nm or less to the print target surface of the print target that is moved along the transport path.

A print target surface reforming device according to a third embodiment is arranged, in a print line where a print target is automatically transported to a printer and printing is performed, on a front side with respect to the printer and which reforms a print target surface of the print target. The print target surface reforming device includes a transport portion which includes, on an upper surface, a transport path along which the print target is transported with the print target surface facing upward, a light source which is arranged apposite the transport path and which emits light of 242 nm or less to the print target surface of the print target that is moved along the transport path. The transport portion includes a card feed guide having, on an upper surface, the transport path along which cards serving as a the print targets are aligned in line and are moved in sliding contact and a card feed portion that is arranged on an upstream side of the card feed guide and which feeds the cards to a side of the card feed guide.

DESCRIPTION OF EMBODIMENTS

[First Embodiment]

Figure 1:
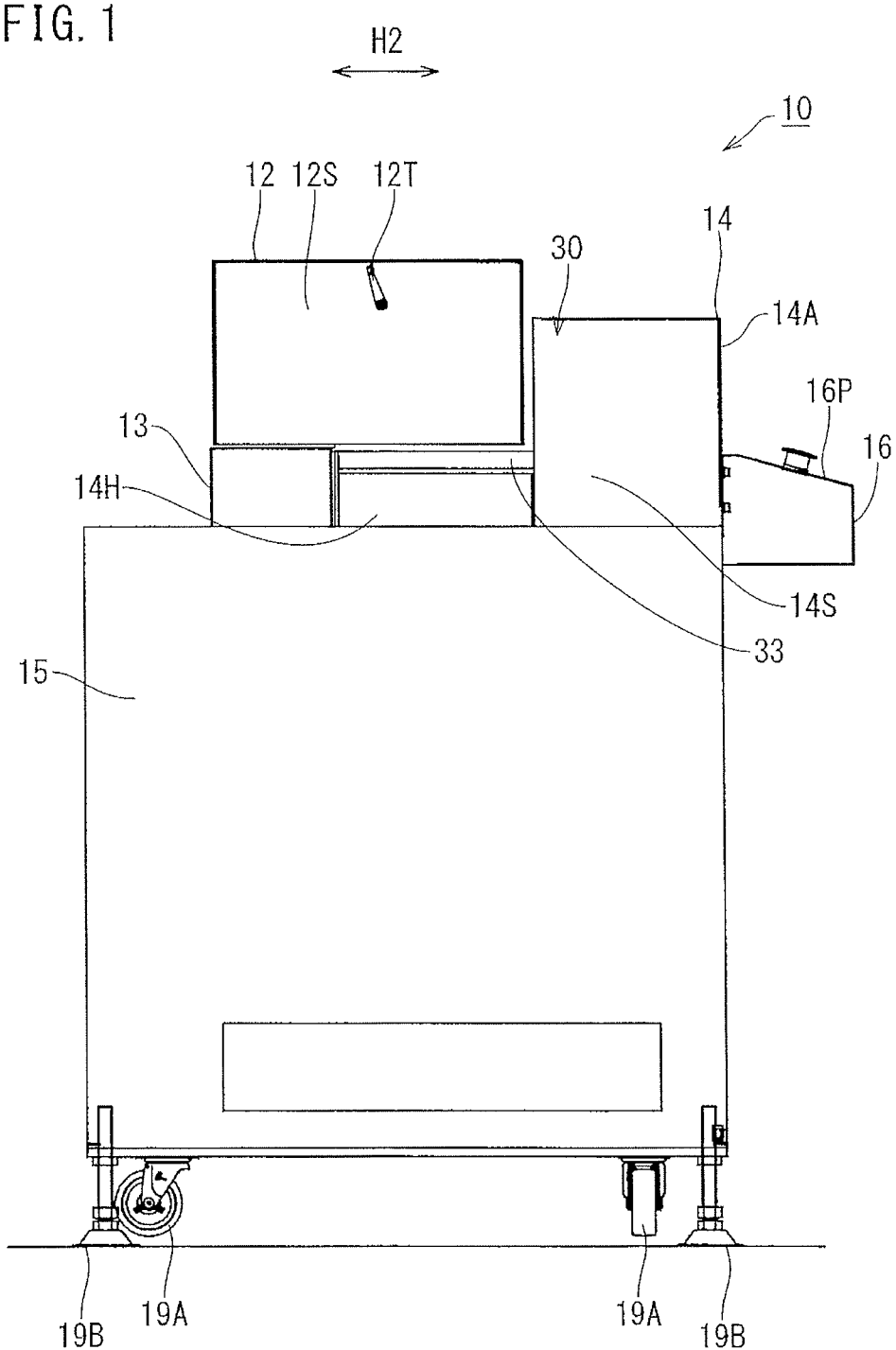
FIG. 1 is a side view of a print target surface reforming device according to a first embodiment of the present invention.
Figure 2:
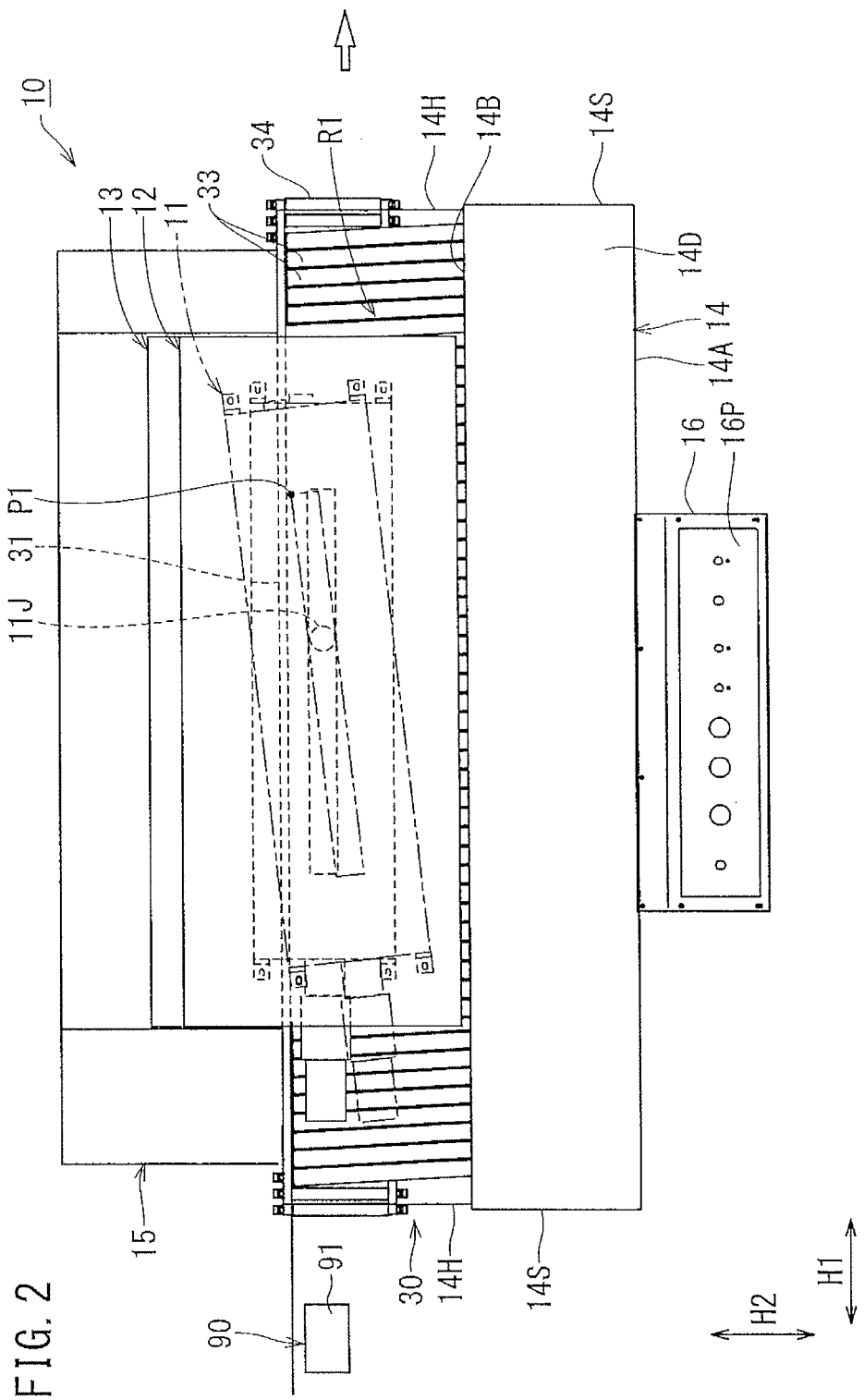
FIG. 2 is a plan view of the print target surface reforming device.
Figure 3:
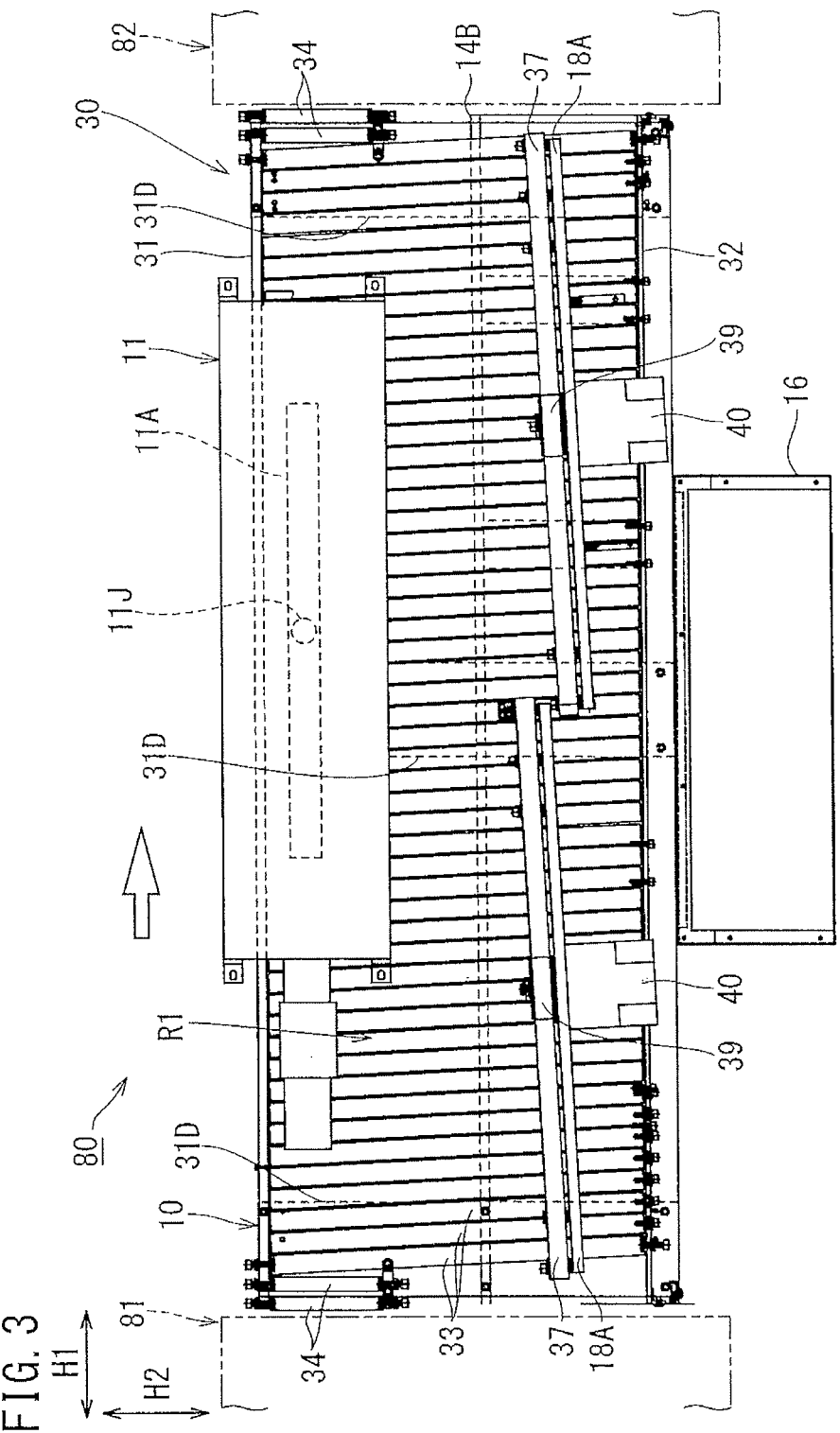
FIG. 3 is a plan view of a print line.

A first embodiment according to the present invention will be described below with reference to FIGS. 1 to 17. As shown in FIG. 1, the print target surface reforming device 10 of the present embodiment includes a transport portion 30 on the upper surface of a base box 15. As shown in FIG. 3, the transport portion 30 has first and second band plate walls 31 and 32 which are extended parallel to each other, and a plurality of metal rollers 33 are placed between the first and second band plate walls 31 and 32. In the following description, the direction in which the first and second band plate walls 31 and 32 are extended is referred to as a "horizontal first direction H1" or a "transport direction" as necessary, and a horizontal direction perpendicularly intersecting the "horizontal first direction H1" is referred to as a "horizontal second direction H2." The right side of the transport direction in FIG. 3 is referred to as a "transport direction downstream side" and the opposite side thereto is referred to as a "transport direction upstream side," the side of the second band plate wall 32 in the print target surface reforming device 10 is referred to as a "front side" and a surface facing the front side is referred to as a "front surface" and the side of the first band plate wall 31 is referred to as a "back side" and a surface facing the back side is referred to as a "back surface."

Figure 4:
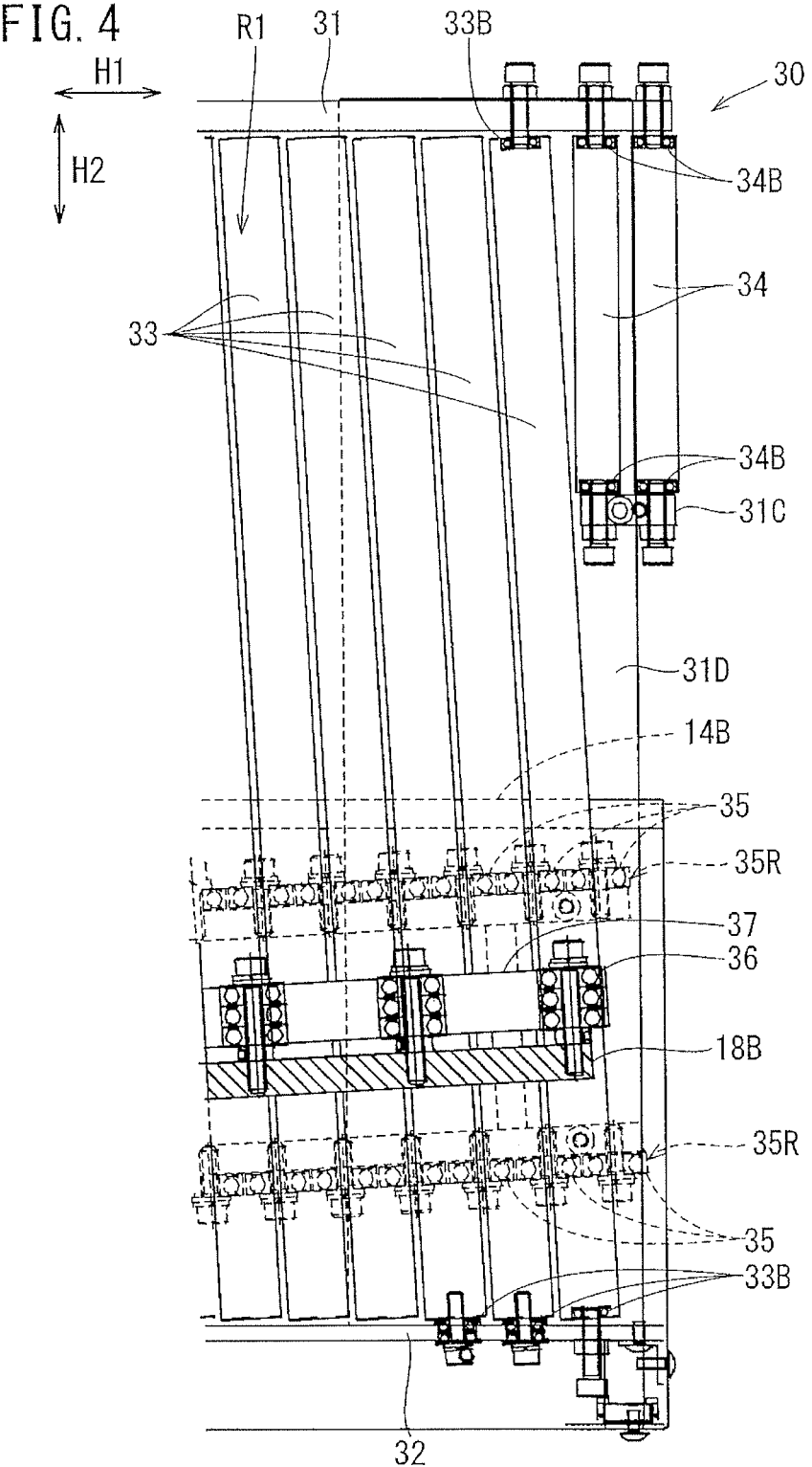
FIG. 4 is a plan view of a group of metal rollers.

For example, a group of the metal rollers 33 is obtained by performing quenching processing on a shaft made of stainless steel (for example, SUS440C). As shown in FIG. 4, the group of the metal rollers 33 is attached through bearings 33B to the first and second band plate walls 31 and 32 in a state where an end portion on the side of the second band plate wall 32 is displaced to the transport direction downstream side with respect to an end portion on the side of the first band plate wall 31.

As shown in FIG. 3, on both sides of the group of the metal rollers 33 in the horizontal first direction H1, two short metal rollers 34 which are shorter than the metal rollers 33 and are extended in the horizontal second direction H2 are respectively arranged. As shown in FIG. 4, one end portion of each of the short metal rollers 34 is attached to the first band plate wall 31 through a bearing 34B, and the other end portion is attached through the bearing 34B to a support wall 31C provided between the first and second band plate walls 31 and 32. Between the lower end portions of the first and second band plate walls 31 and 32, as shown in FIG. 3, lower end communication plates 31D are laid at three places that are both end portions and an intermediate portion in the horizontal first direction H1, and the support wall 31C is arranged to stand on the lower end communication plates 31D on both ends.

Figure 15:
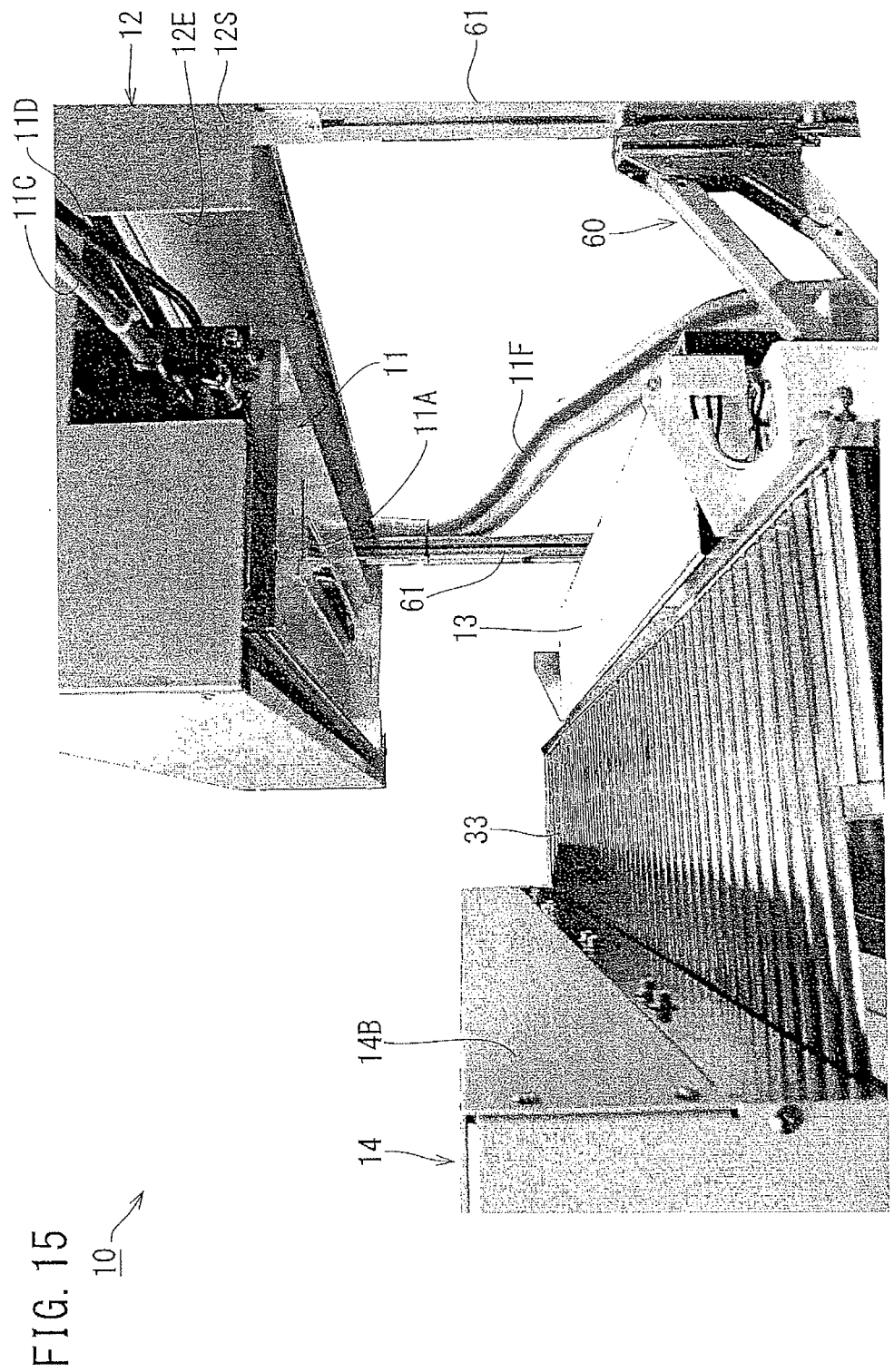
FIG. 15 is a photogram of an excimer lamp.

The uppermost portions of the group of the metal rollers 33 and the group of the short metal rollers 34 are located within the same imaginary plane, and in the imaginary plane, the side of the first band plate wall 31 (more specifically, a portion exposed from a drive portion cover 14 which will be described later) with respect to substantially the center in the horizontal second direction H2 is a transport path R1 in the present invention. The first band plate wall 31 corresponds to a "locating member" in the present invention, and as shown in FIG. 15, is slightly protruded upward from the transport path R1.

As shown in FIG. 3, friction belts 37 are pressed from above onto the group of the metal rollers 33 in positions displaced to the end portions on the side of the second band plate wall 32 in the axial direction thereof. Specifically, the two friction belts 37 are provided, one friction belt 37 is extended so as to make contact with all the metal rollers 33 in an upstream side group ranging from the upstream side to the center portion in the transport direction and to perpendicularly intersect the center shafts of the metal rollers 33 and the other friction belt 37 is extended so as to make contact with all the remaining metal rollers 33, in a downstream side group and to perpendicularly intersect the center shafts of the metal rollers 33.

Figure 6:
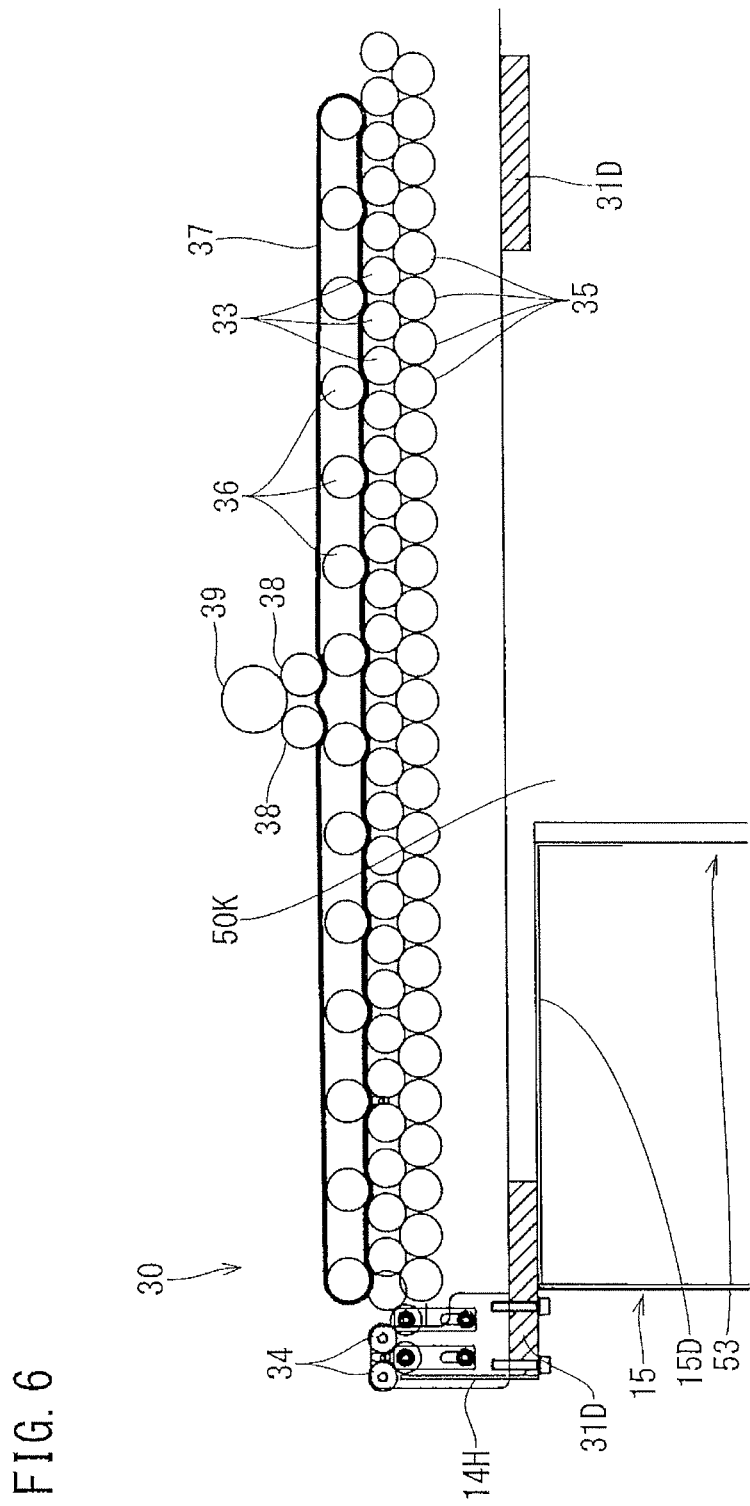
FIG. 6 is a side view of the back surface side of a transport portion.
Figure 7:
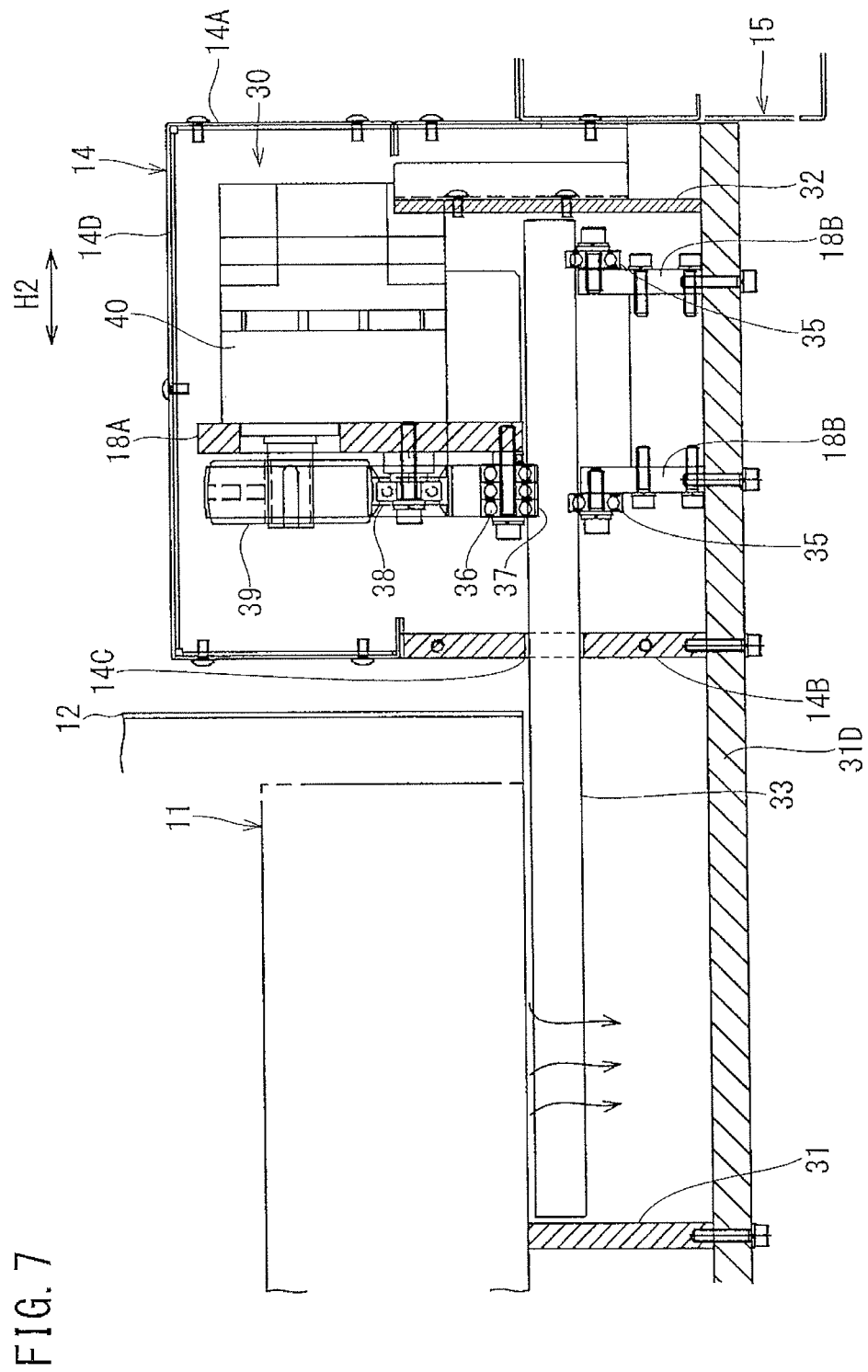
FIG. 7 is a cross-sectional view of the transport portion.

As shown in FIG. 6, within each of the friction belts 37, a belt support roller 36 is provided every two metal rollers 33. Each belt support roller 36 is arranged so as to straddle between the adjacent metal rollers 33, 33, and thus the friction belt 37 is pressed onto both of the metal rollers 33, 33. In this way, the friction belt 37 is sandwiched between all the metal rollers 33 and the belt support rollers 36. When the friction belt 37 is rotated in one direction, the group of the metal rollers 33 is rotated by receiving friction power. As shown in FIG. 7, on the side of the second band plate wall 32 with respect to each of the friction belts 37, a roller support protrusion wall 18A formed in the shape of a band plate is respectively extended, and a support shaft which rotatably supports the group of the belt support rollers 36 is attached to the roller support protrusion wall 18A in a cantilevered state. The roller support protrusion wall 18A is supported by an unillustrated protrusion wall which overhangs horizontally from the second band plate wall 32.

As shown in FIG. 3, in order to drive the friction belts 37, 37, for each of the friction belts 37, one motor 40 (which corresponds to a "rotation drive source" in the present invention) is provided. Each motor 40 is fixed in the center of the roller support protrusion wall 18A in the longitudinal direction, and as shown in FIG. 7, has a rotation output shaft above the friction belt 37. A drive roller 39 is fixed to the rotation output shaft, and under the drive roller 39, as shown in FIG. 6, a pair of relay rollers 38, 38 whose diameter is smaller than that of the drive roller 39 are rotatably supported by the roller support protrusion wall 18A. Then, the drive roller 39 makes contact with the pair of relay rollers 38, 38, and thus the relay rollers 38, 38 are pressed, through the friction belt 37, onto a pair of the belt support rollers 36. In this way, the friction belt 37 and the group of the metal rollers 33 are rotated by receiving power from the motor 40, and a frictional force for moving a print target 90 in a direction slightly inclined with respect to the horizontal first direction H1 is provided to the print target 90 on the group of the metal rollers 33, with the result that the print target 90 is transported in the horizontal first direction H1 while being pressed onto the first band plate wall 31 and located.

Figure 8:
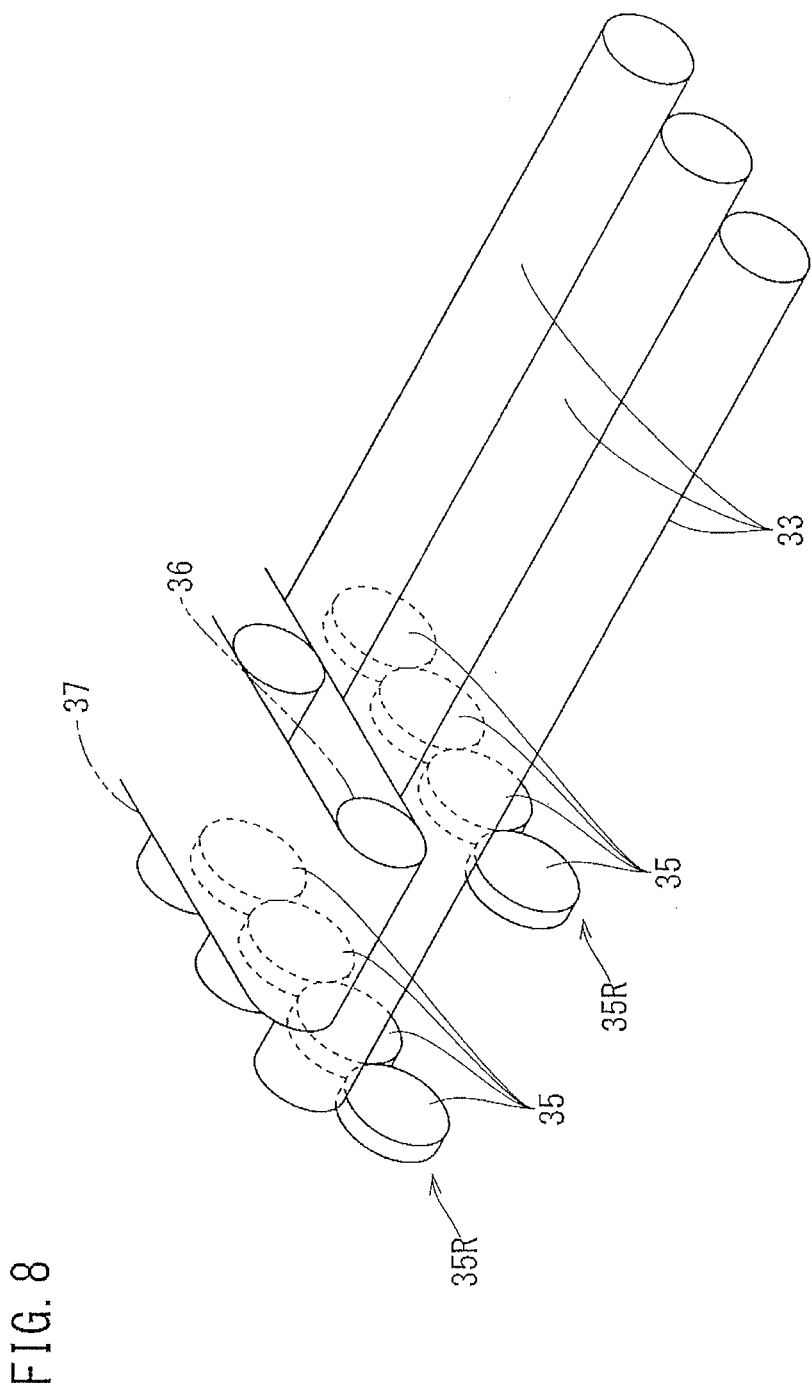
FIG. 8 is a perspective view of a metal roller, a load support roller and a friction belt.

As shown in FIG. 7, below the group of the metal rollers 33, in a position displaced to the second band plate wall 32, a plurality of load support rollers 35 are provided. The plurality of load support rollers 35 have a rotation shaft parallel to the group of the metal rollers 33, are aligned, as shown in FIG. 4, side by side in a direction inclined with respect to the horizontal second direction H2 as with the metal rollers 33 and form a support roller row 35R. For each of the friction belts 37, a pair of support roller rows 35R, 35R are provided. The pair of support roller rows 35R, 35R are arranged in positions which are offset from the respective friction belts 37 to one side and the other side of the metal rollers 33, 33 in the axial direction. As shown in FIGS. 6 and 8, each of the load support rollers 35 in each support roller row 35R is arranged so as to straddle between the adjacent two metal rollers 33 and are pressed onto the metal rollers 33.

The load support roller 35 of the present embodiment is the outer of a bearing, and a bolt which is passed through the inner of the bearing is tightened to a bearing support wall 18B that is arranged to stand on the lower end communication plates 31D (see FIG. 7).

Figure 13:
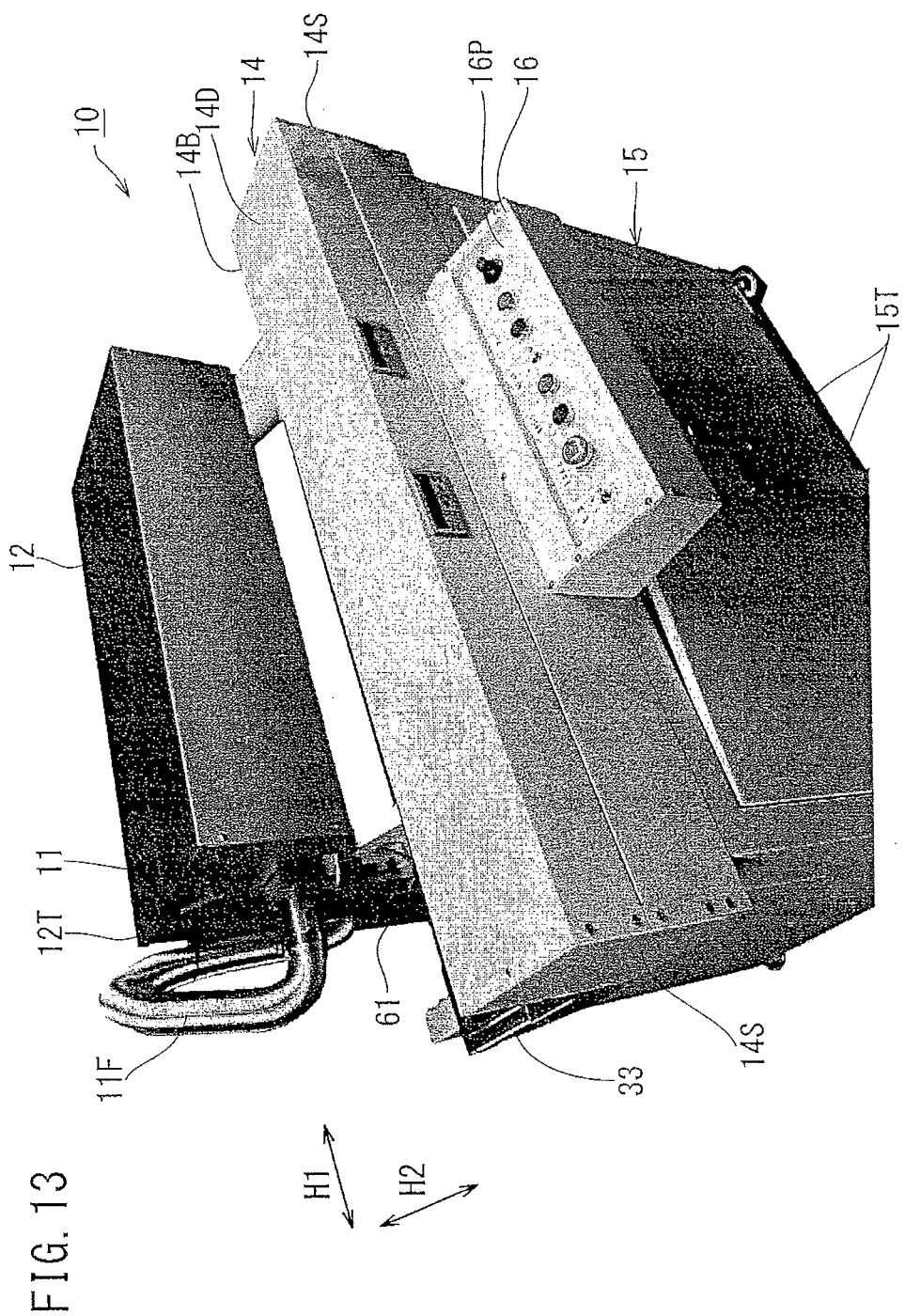
FIG. 13 is a photogram of the print target surface reforming device.

As shown in FIG. 7, the entire front side of the transport portion 30 in the horizontal second direction H2 is covered with the drive portion cover 14. Specifically, the front surface wall 14A of the drive portion cover 14 is opposite the second band plate wall 32 from the opposite side of the first band plate wall 31, and stands on the extended line of the front surface of the base box 15. The back surface wall 14B of the drive portion cover 14 has a side surface slit 14C penetrated by the group of the metal rollers 33, is located slightly on the side of the second band plate wall 32 between the first and second band plate walls 31, 32 and stands on the lower end communication plates 31D. Furthermore, a portion between the upper ends of the front surface wall 14A and the back surface wall 14B is blocked by an upper surface wall 14D, and as shown in FIG. 13, portions between both ends of the front surface wall 14A and the back surface wall 14B in the longitudinal direction are blocked by side surface walls 14S, 14S. In this way, the entire front side of the transport portion 30 in the horizontal second direction H2 is covered with the drive portion cover 14.

Figure 5:
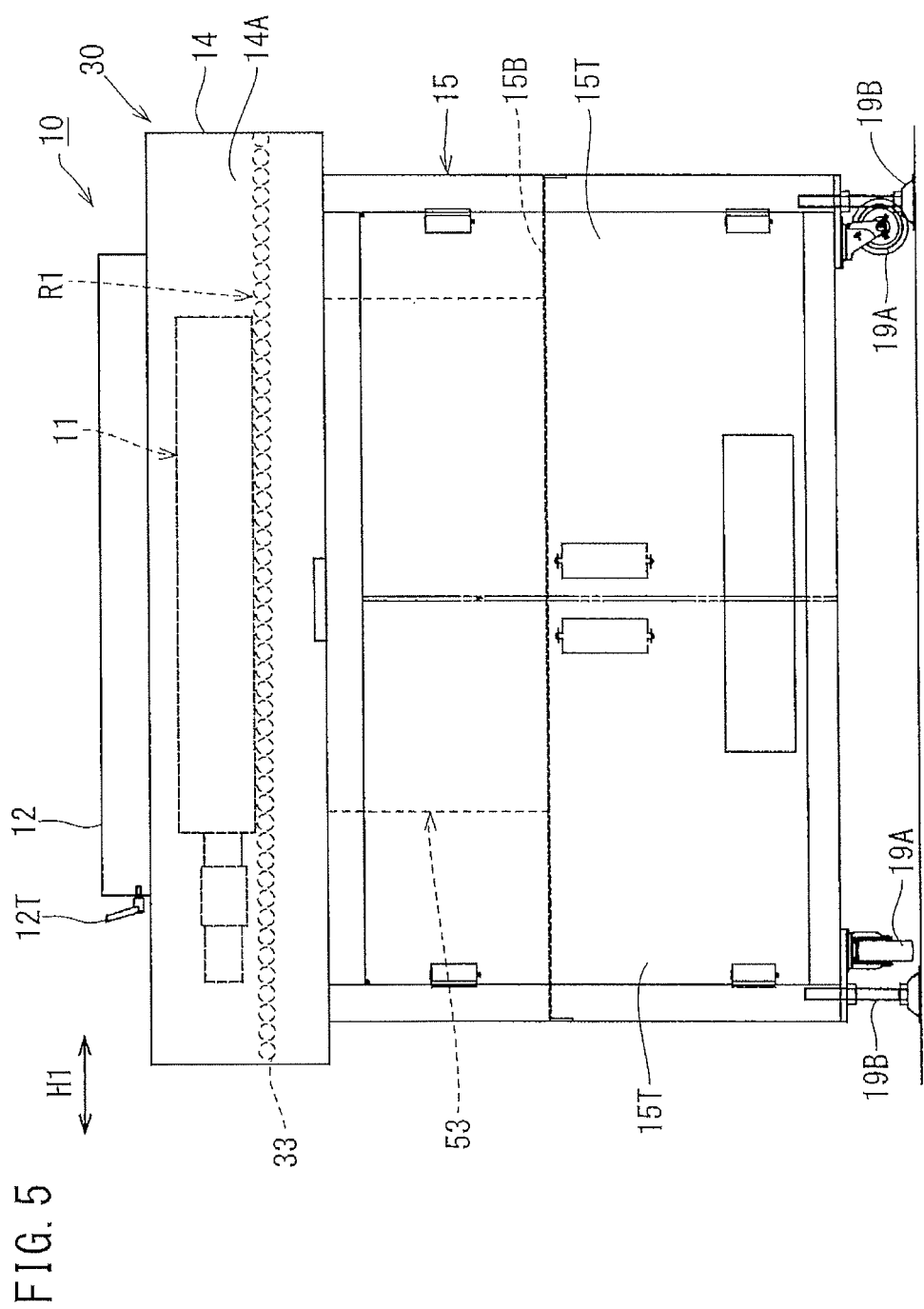
FIG. 5 is a side view of the front surface side of the print line.
Figure 14:
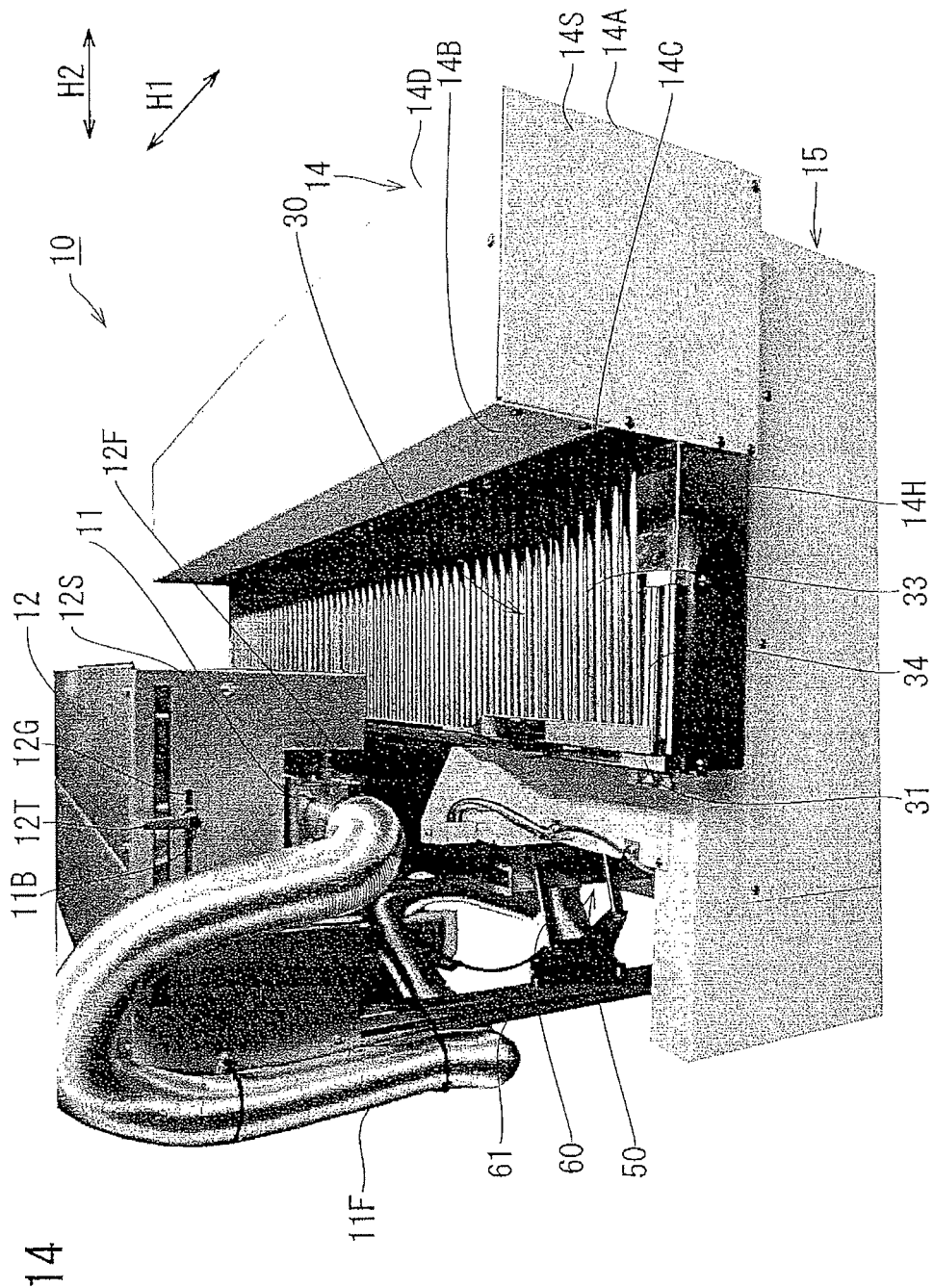
FIG. 14 is a photogram of the print target surface reforming device.

As shown in FIG. 5, both end portions of the transport portion 30 in the horizontal first direction H1 are protruded from the base box 15, and the entire transport portion 30 other than both end portions is placed on the base box 15. The lower surfaces of the portions of the transport portion 30 protruded from the base box 15 in the horizontal first direction H1 are blocked by the lower end communication plates 31D, 31D described previously (see FIG. 6). The end surfaces of the transport portion 30 which face the horizontal first direction H1 are, as shown in FIG. 14, blocked by the side surface walls 14S described previously and end portion covers 14H, 14H laid between the first and second band plate walls 31 and 32 and the back surface wall 14B.

As shown in FIG. 5, the base box 15 has a rectangular parallelepiped structure, and includes casters 19A in the four corners of the lower surface and extendable support legs 19B. When the support legs 19B are contracted, the base box 15 can be moved with the casters 19A whereas when the support legs 19B are extended, the base box 15 can be fixed to a desired position. As will be described in detail later, as shown in FIG. 14, the substantially entire back surface of the base box 15 is open, and the substantially entire upper surface of the base box 15 other than the upstream side portion in the transport direction is open. Furthermore, in the front surface of the base box 15, a pair of front surface doors 15T, 15T aligned laterally are provided, as shown in FIG. 13, a front surface protrusion portion 16 is protruded from an upper portion of the front surface and an operation panel 16P is provided on the front surface protrusion portion 16.

Figure 9:
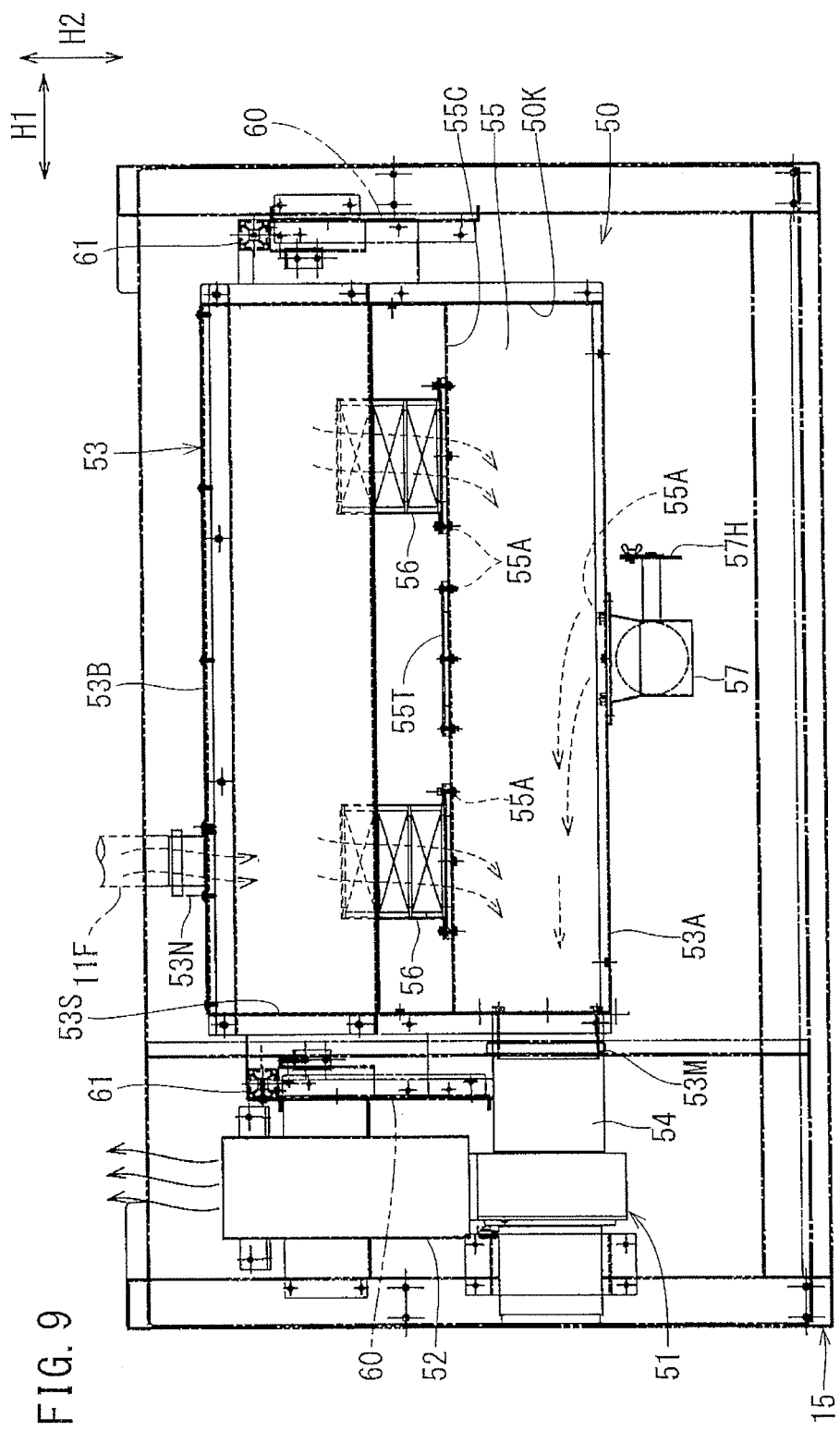
FIG. 9 is a plan view of an ozone suction processing device.
Figure 11:
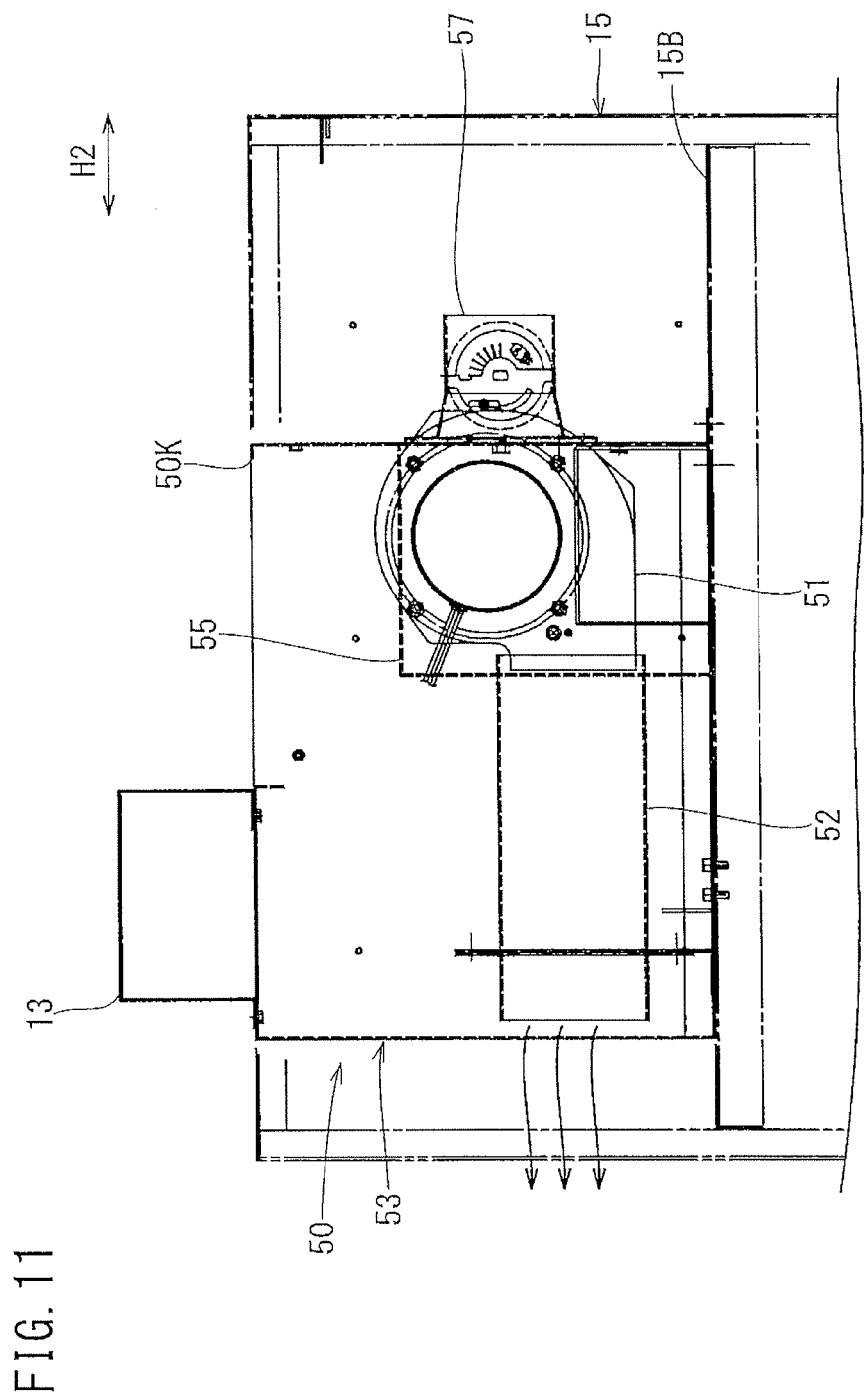
FIG. 11 is a side view of the ozone suction processing device.

The interior of the base box 15 is vertically divided into two parts with a shelf plate 15B, and on the shelf plate 15B, an ozone suction processing device 50 (which corresponds to an "ozone suction processing portion" in the invention) is arranged. As shown in FIG. 9, the ozone suction processing device 50 has a structure in which a suction pump 51 is coupled to a relay box 53. The relay box 53 is formed in the shape of a rectangular parallelepiped which is long in the horizontal first direction H1. As shown in FIG. 11, the upper surface of the relay box 53 is flush with the upper surface of the entire base box 15, and in the upper surface, an upper surface opening 50K is formed on the front side with respect to an intermediate portion in the horizontal second direction H2. The opening edge of the upper surface opening 50K in the relay box 53 is attached to an opening (hereinafter referred to as a "lower surface opening of the transport portion 30") between the lower end portions of the first band plate wall 31 of the transport portion 30 and the back surface wall 14B of the drive portion cover 14. As shown in FIG. 5, the relay box 53 is arranged in a position displaced to the downstream side of the transport portion 30 in the transport direction (the horizontal first direction H1), and the lower surface opening of the transport portion 30 except a portion coupled to the relay box 53 is blocked by the lower end communication plates 31D described above and a blocking plate 15D (see FIG. 6).

In the present embodiment, the first band plate wall 31, the side surface wall 14S of the drive portion cover 14, the end portion cover 14H, the lower end communication plate 31D and the blocking plate 15D described above form a "roller group lower cover" in the present invention.

Figure 10:
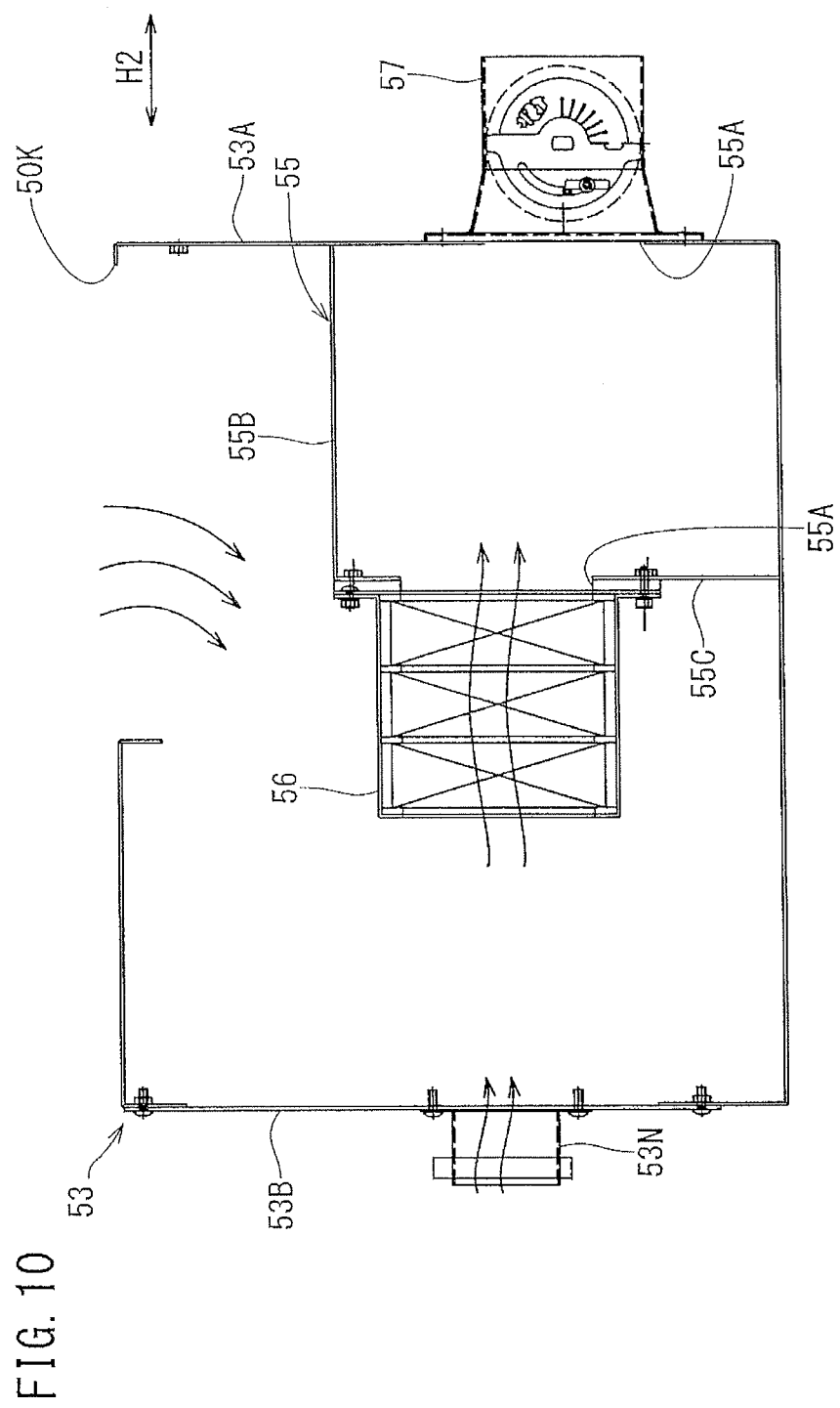
FIG. 10 is a side cross-sectional view of a relay box.

As shown in FIG. 10, within the relay box 53, an internal duct 55 is provided below the upper surface opening 50K. The internal duct 55 is formed with a top plate 55B which overhangs horizontally backward from an intermediate position of a front surface wall 53A in an up/down direction within the relay box 53 and a standing plate 55C which blocks a portion between the top end of the top plate 55B and the bottom surface within the relay box 53, and as shown in FIG. 9, is extended entirely in the horizontal first direction H1 within the relay box 53. At three portions of the standing plate 55C in the horizontal first direction H1, through holes 55A are formed, and the through holes 55A, 55A on both sides are covered with ozone decomposition units 56, 56. The interior of the ozone decomposition unit 56 has a filter structure in which a catalyst is fixed, and ozone is passed through the ozone decomposition unit 56 so as to be decomposed into oxygen.

The through hole 55A in the center of the standing plate 55C is blocked by a lid member 55T. In a portion of the front surface wall 53A of the relay box 53 which faces the inside of the internal duct 55, a through hole 55A is also formed by penetrating the portion, and an opening/closing valve 57 is attached thereto. The degree of opening of the opening/closing valve 57 can be changed by the operation of a handle 57H provided with the opening/closing valve 57. A tube attachment nozzle 53N is protruded from the outer surface of a back surface wall 53B of the relay box 53, and an exhaust tube 11F extended from an excimer lamp 11 (which corresponds to a "light source" in the present invention) to be described later is attached thereto.

Figure 12:
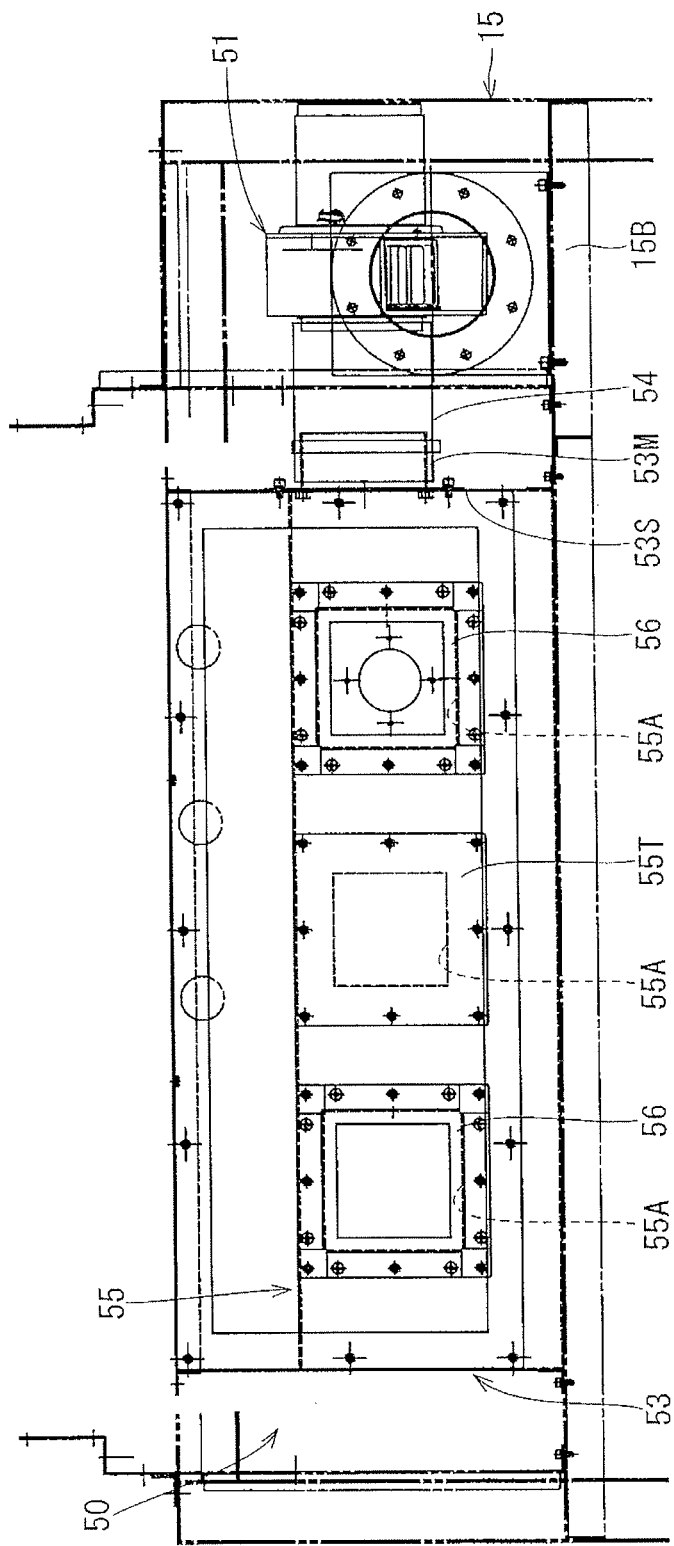
FIG. 12 is a side view of the back surface side of the ozone suction processing device.

As shown in FIG. 9, the suction pump 51 is arranged on the upstream side of the relay box 53 in the transport direction. On the other hand, as shown in FIG. 12, a relay nozzle 53M is protruded from a portion of a side wall 53S on the upstream side of the relay box 53 in the transport direction that faces the interior of the internal duct 55, and the suction port of the suction pump 51 is attached thereto through a relay pipe 54. As shown in FIG. 9, an exhaust duct 52 is attached to the discharge port of the suction pump 51, and is extended close to an opening in the back surface of the base box 15. When the suction pump 51 is operated, a gas in a space below the group of the metal rollers 33 and a gas within the excimer lamp 11 are collected into the relay box 53, and furthermore, they are passed from the ozone decomposition units 56 through the internal duct 55, are sucked by the suction pump 51, are passed through the exhaust duct 52 and are discharged to the outside of the base box 15.

As shown in FIG. 11, in the upper surface of the relay box 53, a box upper surface stage 13 is attached to the back of the upper surface opening 50K. The box upper surface stage 13 is formed in the shape of a rectangular tube and is extended over the entire ozone suction processing device 50 in the horizontal first direction H1. As shown in FIG. 15, the upper surface of the box upper surface stage 13 is located slightly upward of the upper surface of the first band plate wall 31.

As shown in FIG. 9, link mechanisms 60, 60 are assembled to both sides of the box upper surface stage 13 in the horizontal first direction H1 within the base box 15. The lower end portions of cover support columns 61, 61 extending in the up/down direction are attached to the rotation ends of the link mechanisms 60, 60, and when the cover support columns 61, 61 are moved vertically so as to draw an arc path in a state where the cover support columns 61, 61 maintain an upright position and are located at the lower end of a vertical movable range, the cover support columns 61, 61 are moved forward as compared with the case where they are located at an upper end (see FIGS. 14 and 16).

As shown in FIG. 14, a lamp cover 12 is attached to the upper end portions of the cover support columns 61, 61. The entire lower surface of the lamp cover 12 is open, and the lamp cover 12 is formed in the shape of a rectangular parallelepiped which is extended in the horizontal first direction H1. The excimer lamp 11 is stored within the lamp cover 12. The excimer lamp 11 is, for example, an RF discharge excimer lamp which emits light of 172 nm, which is made by Hamamatsu Photonics K.K. and which has a manufacturing number of L12431, is formed, as shown in FIG. 15, in the shape of a rectangular parallelepiped (see FIG. 17) which is slightly smaller than the lamp cover 12 extending in the horizontal first direction H1 and has, in its lower surface, a rectangular light emission portion 11A extending in the horizontal first direction H1. Furthermore, in the excimer lamp 11, a rotation shaft 11J (see FIG. 2) provided in the center of the upper surface is rotatably coupled to the ceiling portion of the lamp cover 12. The lower surface of the excimer lamp 11 and the lower surface of the lamp cover 12 are arranged so as to be substantially flush with each other.

As shown in FIG. 14, in a side portion wall 12S of the lamp cover 12 on the upstream side in the transport direction, a slit 12G extended in the horizontal second direction H2 is formed in a position displaced upward, and an operation bar 11B extended from the excimer lamp 11 is protruded through the slit 12G to the outside of the lamp cover 12. A lever 12T is attached to the end portion of the operation bar 11B. The operation bar 11B is operated, and thus the excimer lamp 11 can be pivoted from outside the lamp cover 12, and the lever 12T is rotated in a predetermined direction, and thus the excimer lamp 11 can be fixed to an arbitrary pivot position. In the present embodiment, the lever 12T, the operation bar 11B and the rotation shaft 11J described above form a "light reception range adjustment mechanism" in the present invention.

Figure 16:
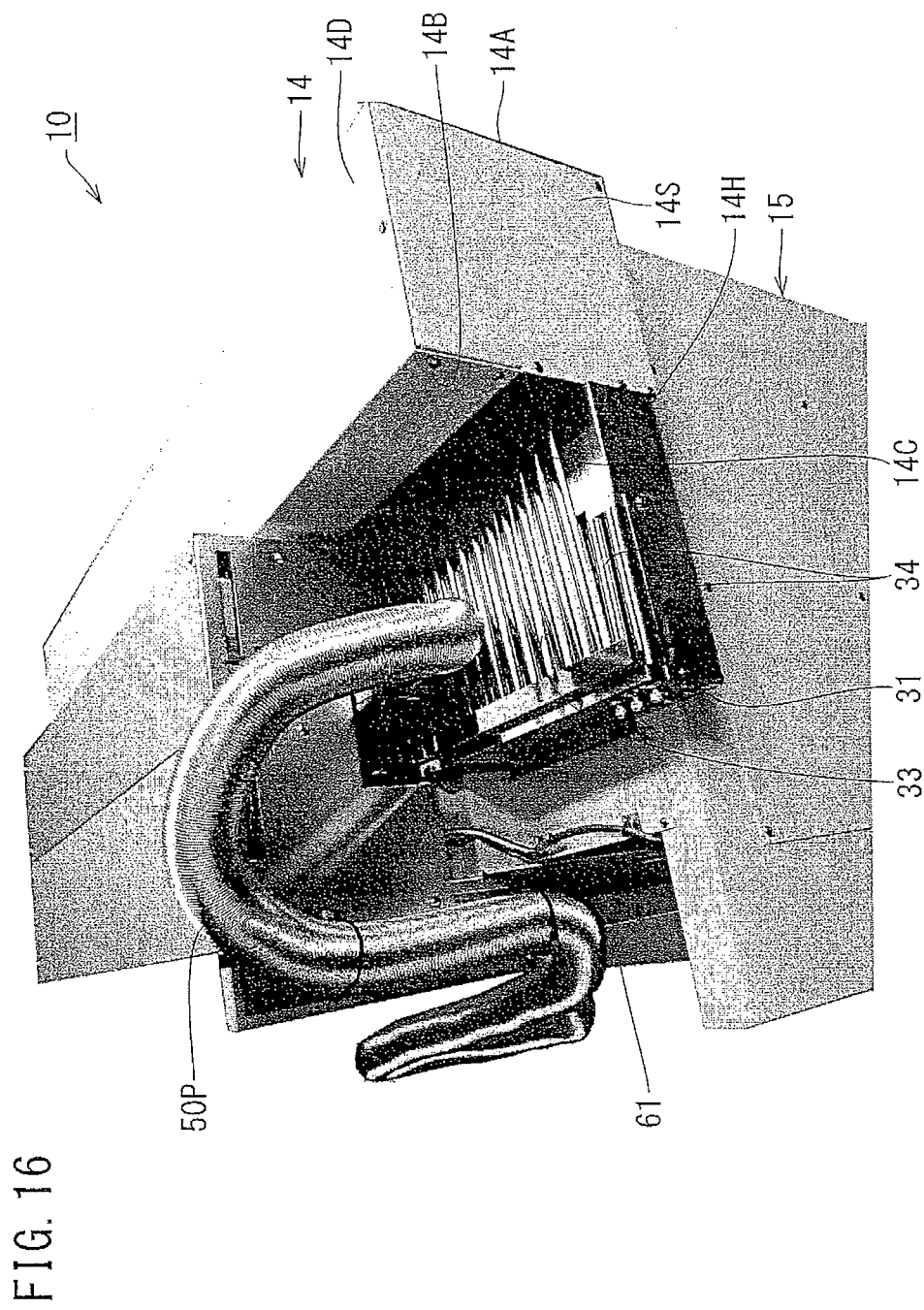
FIG. 16 is a photogram of the print target surface reforming device when it is operated.
Figure 17:
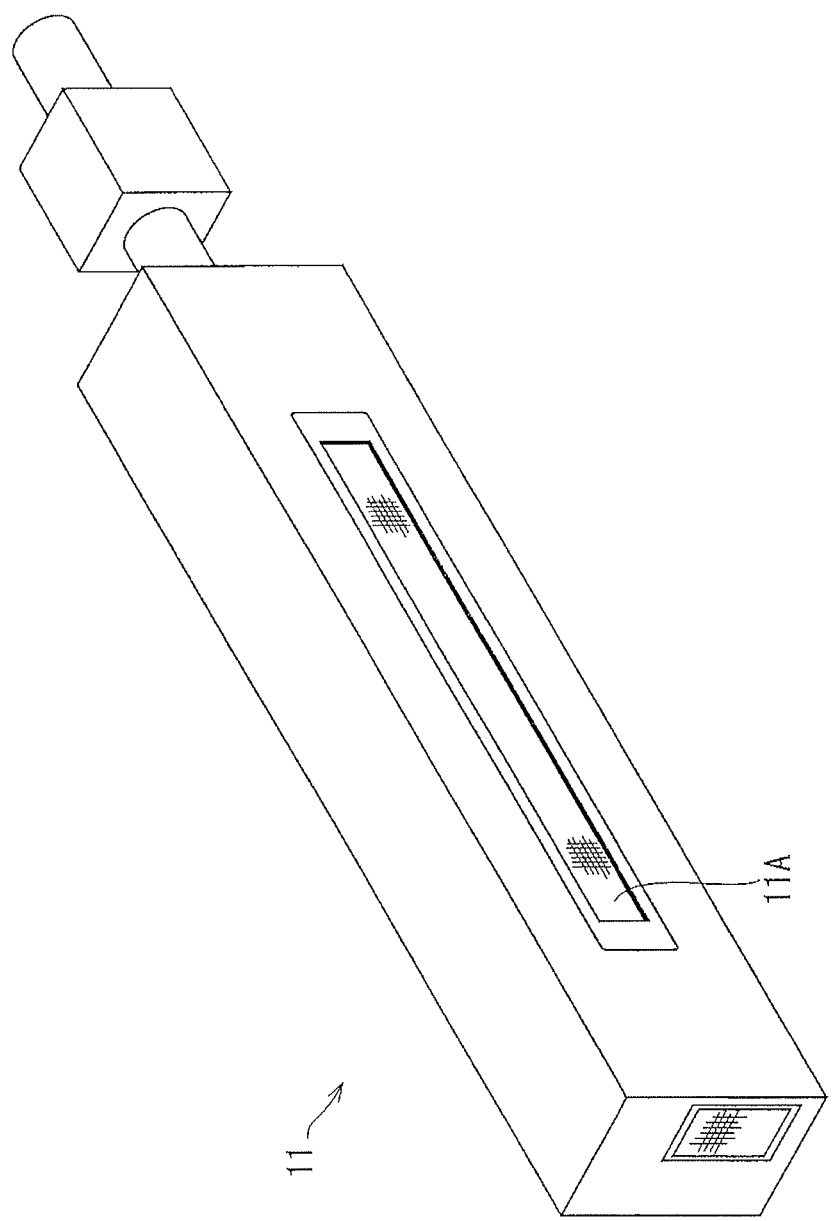
FIG. 17 is a perspective view of the excimer lamp.

As shown in FIG. 15, when the lamp cover 12 is arranged together with the cover support columns 61, 61 in the upper end position of the vertical movable range, the excimer lamp 11 is located immediately above the box upper surface stage 13. As shown in FIG. 16, when the lamp cover 12 is arranged together with the cover support columns 61, 61 in the lower end position of the vertical movable range, the light emission portion 11A of the excimer lamp 11 is, located immediately above the group of the metal rollers 33, and part of the excimer lamp 11 other than light emission portion 11A is located immediately above the box upper surface stage 13. Here, between the lamp cover 12 and the excimer lamp 11 and the group of the metal rollers 33, a slight gap is formed through which the print target 90 can be passed without contact with the excimer lamp 11 and the lamp cover 12. As shown in FIG. 2, when the longitudinal direction of the light emission portion 11A is arranged parallel to the horizontal first direction H1, in the horizontal second direction H2, a gap is formed between the first band plate wall 31 and the light emission portion 11A whereas when the excimer lamp 11 is arranged at an end portion of a pivot range, in the horizontal second direction H2, one end corner portion (see a symbol "P1" in FIG. 2) of the light emission portion 11A is adjacent to a surface of the first band plate wall 31 which faces the side of the group of the metal rollers 33, and the other end corner portion of the light emission portion 11A is separate from the first band plate wall 31.

As shown in FIG. 15, a power supply cable 11C and a gas tube 11D for supplying a cooling gas are connected to the end surface of the excimer lamp 11 on the downstream side in the transport direction. The power supply cable 11C and the gas tube 11D are drawn through a first window 12E formed in the side portion wall 12S of the lamp cover 12 to the outside. As shown in FIG. 14, an exhaust tube 11F for exhausting the cooling gas passed through the excimer lamp 11 is connected to the end surface of the excimer lamp 11 on the upstream side in the transport direction. The exhaust tube 11F is drawn through a second window 12F formed in the side portion wall 12S of the lamp cover 12 to the outside, and is connected to the tube attachment nozzle 53N of the relay box 53 described above.

The configuration of the print target surface reforming device 10 of the present embodiment has been described above. The action effect of the print target surface reforming device 10 will now be described. As shown in FIG. 3, in a print line 80, for example, the print target surface reforming device 10 is arranged between a feeder 81 and a printer 82. The print target 90 (see FIG. 2) to which the feeder 81 supplies is, for example, a card that is made of resin or paper (for example, a credit card or a membership card, etc.), and a plurality of print targets 90 are stacked on the feeder 81. The feeder 81 draws the print targets 90 one by one from the lower end portion of a group of the print targets 90, and provides the print target 90 onto the group of the metal rollers 33 in the print target surface reforming device 10. On the other hand, the printer 82 is, for example, an inkjet type, receives the print targets 90 one by one from the print target surface reforming device 10, applies, for example, an ultraviolet-curable ink to the upper surface of the print target 90 and prints predetermined information.

In order for the print target surface reforming device 10 to be used, as shown in FIG. 16, in a state where the excimer lamp 11 is overlaid on the group of the metal rollers 33, the suction pump 51 (see FIG. 9) is started up, with the result that the space below the group of the metal rollers 33 is brought into a negative pressure state. Here, the degree of opening of the opening/closing valve 57 is changed to adjust the pressure below the group of the metal rollers 33, the gas above the entire group of the metal rollers 33 and the gas within the lamp cover 12 are passed through a gap between the adjacent metal rollers 33, 33 and thus the pressure is changed to such a pressure that the gasses can be gently sucked into the area below the group of the metal rollers 33. Then, the motors 40, 40 are started up to drive and rotate the metal rollers 33, and the excimer lamp 11 is finally started up. In this way, the preparation of the print target surface reforming device 10 is completed.

Thereafter, the feeder 81 and the printer 82 are started up. Then, the print targets 90 are provided one by one from the feeder 81 to the upstream side of the group of the metal rollers 33 in the print target surface reforming device 10. The print target 90 provided to the print target surface reforming device 10 receives, from the group of the metal rollers 33, frictional power which is inclined obliquely forward with respect to the horizontal first direction H1, and is moved below the excimer lamp 11 in a state where one side surface is pressed onto the first band plate wall 31. The print target 90 receives light emitted from the light emission portion 11A of the excimer lamp 11, and thus the print target surface 91 of the print target 90 is reformed. The print target 90 which is passed through the excimer lamp 11 is passed to the printer 82 from the end portion of the group of the metal rollers 33 on the downstream side, and the printer 82 applies the ink to the reformed print target surface 91 of the print target 90 to print the predetermined information and applies ultraviolet rays to the ink to cure the ink. In this way, the printing on the print target 90 is completed.

As described above, in the print target surface reforming device 10 of the present embodiment, the light of the excimer lamp 11 is irradiated to the print target surface 91 of the print target 90, and thus it is possible to obtain a higher reforming effect than a conventional one.

With light of 242 nm or less, it is possible to perform the reformation, and as the wavelength thereof is decreased, the efficiency of the reformation is enhanced. However, when the wavelength is 160 nm or less, permeability to synthetic quartz glass is significantly lowered, and thus it is necessary to use, as a lamp envelope, a crystal material which is expensive and has poor processability. By contrast, in the present embodiment, since the excimer lamp 11 which emits the light of 172 nm is used, it is possible to reduce an increase in the cost and to enhance the efficiency of the reformation.

Although the excimer lamp 11 generates ozone while being operated, since in the print target surface reforming device 10 of the present embodiment, such ozone is sucked by the ozone suction processing device 50, is decomposed into oxygen and is discharged, the excimer lamp 11 can be used by being assembled into the print line 80 without worry about harm to the human body. Since the ozone is sucked through the gap between the metal rollers 33, 33 feeding the print target 90, the print target 90 can be pressed onto the group of the metal rollers 33 by the suction, and the friction between the print target 90 and the metal rollers 33 is increased, with the result that the print target 90 is stably transported. Furthermore, since the print target 90 is transported with one side surface of the print target 90 pressed onto the first band plate wall 31 extended along the side portion of the transport path R1, the position of the print target 90 which has been passed through the print target surface reforming device 10 is stabilized, and the print position of the print target 90 in the printer 82 is also stabilized.

Since a plurality of metal rollers 33 are driven to rotate by the frictional power from the friction belt 37, as compared with a configuration in which a gear and a timing belt are provided for each of the metal rollers 33, the print target surface reforming device 10 can be manufactured inexpensively. Furthermore, with the load support rollers 35 below the metal rollers 33, it is possible to reduce a load received by the metal rollers 33 from the friction belt 37. In the print target surface reforming device 10 of the present embodiment, the excimer lamp 11 is pivoted, and thus the range of the transport path R1 in a width direction which receives the light from the excimer lamp 11 can be changed, with the result that it is possible to easily respond to a plurality of types of print targets 90.

[Second Embodiment]

Figure 18:
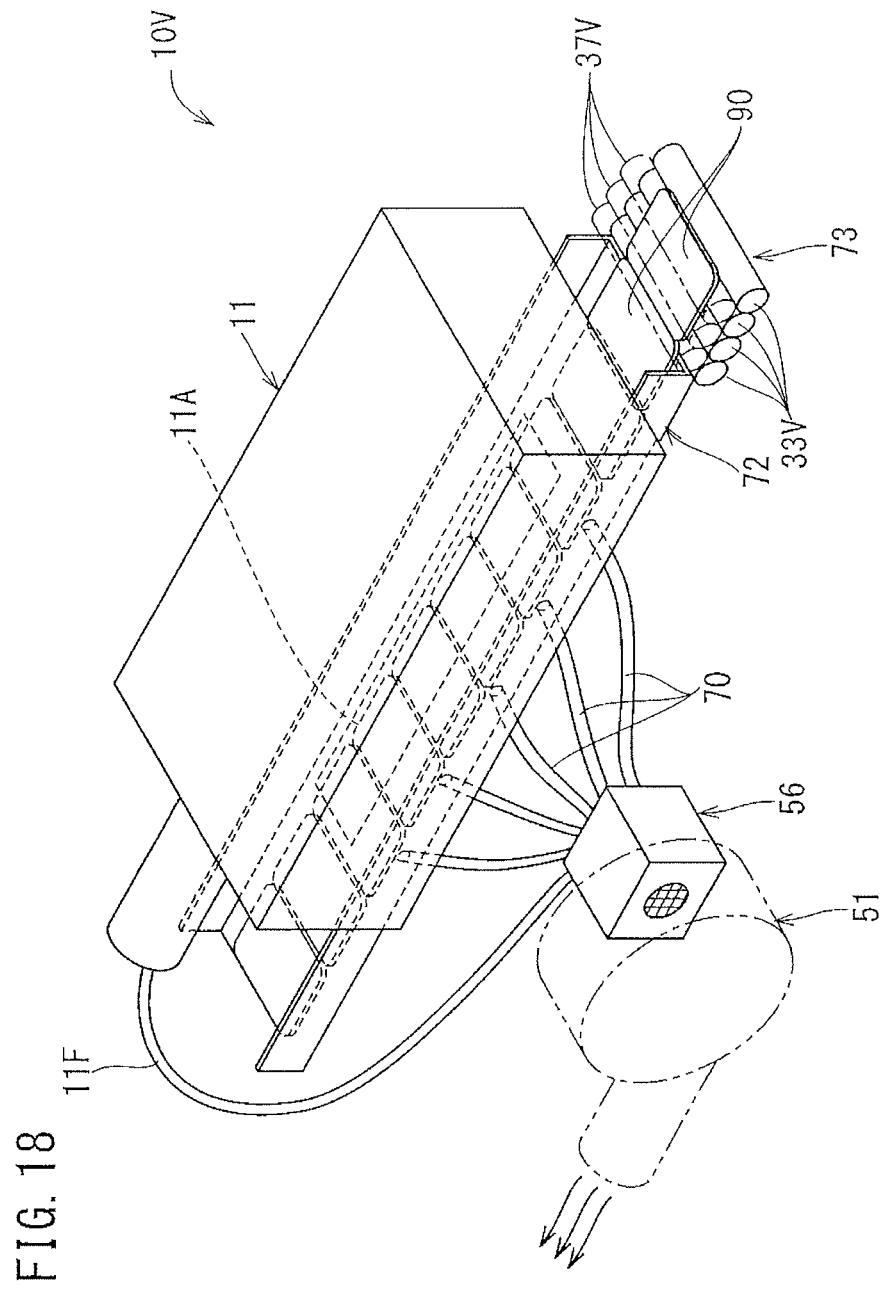
FIG. 18 is a perspective view of a print target surface reforming device according to a second embodiment.

The print target surface reforming device 10V of the present embodiment includes a card feed guide 72 which is fixed to the lower surface of the same excimer lamp 11 as in the first embodiment as shown in FIG. 18. The card feed guide 72 is formed, for example, by bending a stainless steel sheet metal in the shape of a rectangular groove, and its overall length is longer than that of the excimer lamp 11. The card feed guide 72 covers the light emission portion 11A of the excimer lamp 11, and both end portions thereof are protruded from both end portions of the excimer lamp 11 in the longitudinal direction. At one end portion of the excimer lamp 11, a card feed portion 73 is provided that sandwiches, in a vertical direction, a card serving as the print target 90 between a plurality of transport rollers 33V and a plurality of transport auxiliary rollers 37V and that feeds the card. The card feed portion 73 and the card feed guide 72 form a "transport portion" in the present invention.

In a side portion of the card feed guide 72, a plurality of through holes are formed along the longitudinal direction, and tubes 70 are coupled to them from the outside. The tubes 70 and the exhaust tube 11F extended from the excimer lamp 11 are collectively connected to one end of the same ozone decomposition unit 56 as in the first embodiment, and furthermore, the suction pump 51 is connected to the other end of the ozone decomposition unit 56. When the ozone decomposition unit 56 is operated, ozone within the excimer lamp 11 and ozone within the card feed guide 72 are passed through the ozone decomposition unit 56 and are decomposed into oxygen.

The print target surface reforming device 10V of the present embodiment is arranged between the feeder 81 and the printer 82 in the print line 80 described in the first embodiment, and thus it is possible to achieve the same action effect as in the print target surface reforming device 10 of the first embodiment.

Other Embodiments

The present invention is not limited to the embodiment described above, and for example, embodiments which will be described below are also included in the technical scope of the present invention, and furthermore, in addition to the following embodiments, various modifications are possible without departing from the spirit.

(1) Although in the embodiment described above, the material of the metal roller 33 or the card feed guide 72 is stainless steel, it may be gold, platinum, titanium or the like.

(2) Although in the embodiment described above, the light source is the excimer lamp, as long as the light source emits light of 242 nm or less, for example, a low-pressure mercury lamp, a deuterium lamp or the like may be used.

(3) Although in the embodiment described above, the decomposition of ozone into oxygen is performed by a configuration with the catalyst, it may be performed by a configuration with, for example, activated carbon, light of 242 to 320 nm, heating, water, a chemical solution or the like.

(4) Although in the embodiment described above, ozone is decomposed into oxygen and is thereafter discharged, a configuration of providing duct facilities or the like to discharge ozone as it is to the atmosphere may be used.

REFERENCE SIGNS LIST 10, 10V: Print target surface reforming device
11: Excimer lamp (light source)

11A: Light emission portion
12: Lamp cover
30: Transport portion
31: First band plate wall (locating member)
33: Metal roller
35: Load support roller
36: Belt support roller
37: Friction belt
40: Motor (rotation drive source)
50: Ozone suction processing device (ozone suction processing portion)
51: Suction pump
52: Exhaust duct
56: Ozone decomposition unit
72: Card feed guide (transport portion)
73: Card feed portion (transport portion)
80: Print line
82: Printer
90: Print target
91: Print target surface
R1: Transport path

The invention claimed is:

1. A print target surface reforming device which is arranged, in a print line where a print target is automatically transported to a printer and printing is performed, on a front side with respect to the printer and which reforms a print target surface of the print target, the print target surface reforming device comprising:
a transport portion which includes a plurality of metal rollers arranged horizontally and laterally and which includes, on an upper surface of a group of the metal rollers, a transport path along which the print target is transported with the print target surface facing upward;
a rotation drive source which drives the plurality of metal rollers to rotate;
a light source which is arranged opposite the transport path and which emits light of 242 nm or less to the print target surface of the print target that is moved along the transport path;
a roller group lower cover which covers the group of the metal rollers from a lower side; and
an ozone suction processing portion which brings an interior of the roller group lower cover into a negative pressure state to suck ozone generated by the light source, which decomposes the ozone into oxygen and which discharges the oxygen.

2. The print target surface reforming device according to claim 1, comprising:
the transport path which is arranged in a position displaced to one end of the group of the metal rollers in a direction of a rotation shaft;
a friction belt which is arranged in a position displaced to the other end of the group of the metal rollers in the direction of the rotation shaft, which is pressed by the group of the metal rollers from above or below and which receives power from the rotation drive source so as to be driven to rotate; and
a belt support roller which supports the friction belt from inside.

3. The print target surface reforming device according to claim 2, further comprising:
a plurality of load support rollers which are provided on an opposite side to the friction belt with the group of the metal rollers sandwiched between the load support rollers and the friction belt, each of which is arranged so as to straddle between the adjacent two metal rollers and which are rotated while being pressed onto the metal rollers.

4. The print target surface reforming device according to claim 1, comprising:
a locating member which is extended along a side portion of the transport path and which is protruded upward from the transport path; and
the plurality of metal rollers which include a rotation shaft inclined with respect to a transport direction and which transport the print target while pressing one side surface of the print target onto the locating member.

5. The print target surface reforming device according to claim 1,
wherein the light source is an excimer lamp.

6. The print target surface reforming device according to claim 1, comprising:
a lamp cover which covers the light source so as to regulate diffusion of the ozone; and
the ozone suction processing portion which brings an interior of the lamp cover into a negative pressure state to suck the ozone, which decomposes the ozone into oxygen and which discharges the oxygen.

7. The print target surface reforming device according to claim 1,
wherein a part of the transport path which receives the light of the light source is formed of stainless steel, gold, platinum or titanium.

8. The print target surface reforming device according to claim 1, further comprising:
a light reception range adjustment mechanism which supports the light source such that the light source can be pivoted about a vertical shaft and which can fix the light source to an arbitrary pivot position.

9. A print target surface reforming device which is arranged, in a print line where a print target is automatically transported to a printer and printing is performed, on a front side with respect to the printer and which reforms a print target surface of the print target, the print target surface reforming device comprising:
a transport portion that includes a plurality of metal rollers arranged horizontally and laterally and that includes a transport path which is arranged in a position, in an upper surface of a group of the metal rollers, displaced to one end of the group of the metal rollers in a direction of a rotation shaft and along which the print target is transported with the print target surface facing upward;
a rotation drive source which drives the metal rollers to rotate;
a friction belt which is arranged in a position displaced to the other end of the group of the metal rollers in the direction of the rotation shaft, which is pressed by the group of the metal rollers from above or below and which receives power from the rotation drive source so as to be driven to rotate;
a belt support roller which supports the friction belt from inside; and
a light source which is arranged opposite the transport path and which emits light of 242 nm or less to the print target surface of the print target that is moved along the transport path.

10. The print target surface reforming device according to claim 9, further comprising:
a plurality of load support rollers which are provided on an opposite side to the friction belt with the group of the metal rollers sandwiched between the load support rollers and the friction belt, each of which is arranged so as to straddle between the adjacent two metal rollers and which are rotated while being pressed onto the metal rollers.

11. The print target surface reforming device according to claim 9, comprising:

a locating member which is extended along a side portion of the transport path and which is protruded upward from the transport path; and the plurality of metal rollers which include a rotation shaft inclined with respect to a transport direction and which transport the print target while pressing one side surface of the print target onto the locating member.

12. The print target surface reforming device according to claim 9, wherein the light source is an excimer lamp.

13. The print target surface reforming device according to claim 9, further comprising:

an ozone suction processing portion which sucks ozone generated by the light source, which decomposes the ozone into oxygen and which discharges the oxygen.

14. The print target surface reforming device according to claim 13, comprising:

a lamp cover which covers the light source so as to regulate diffusion of the ozone; and the ozone suction processing portion which brings an interior of the lamp cover into a negative pressure state to suck the ozone, which decomposes the ozone into oxygen and which discharges the oxygen.

15. The print target surface reforming device according to claim 9, wherein a part of the transport path which receives the light of the light source is formed of stainless steel, gold, platinum or titanium.

16. The print target surface reforming device according to claim 9, further comprising:

a light reception range adjustment mechanism which supports the light source such that the light source can be pivoted about a vertical shaft and which can fix the light source to an arbitrary pivot position.

\* \* \* \* \*